Sept. 19, 1944.   M. L. E. CHWALOW   2,358,316
SIGHTING DEVICE
Filed July 20, 1942
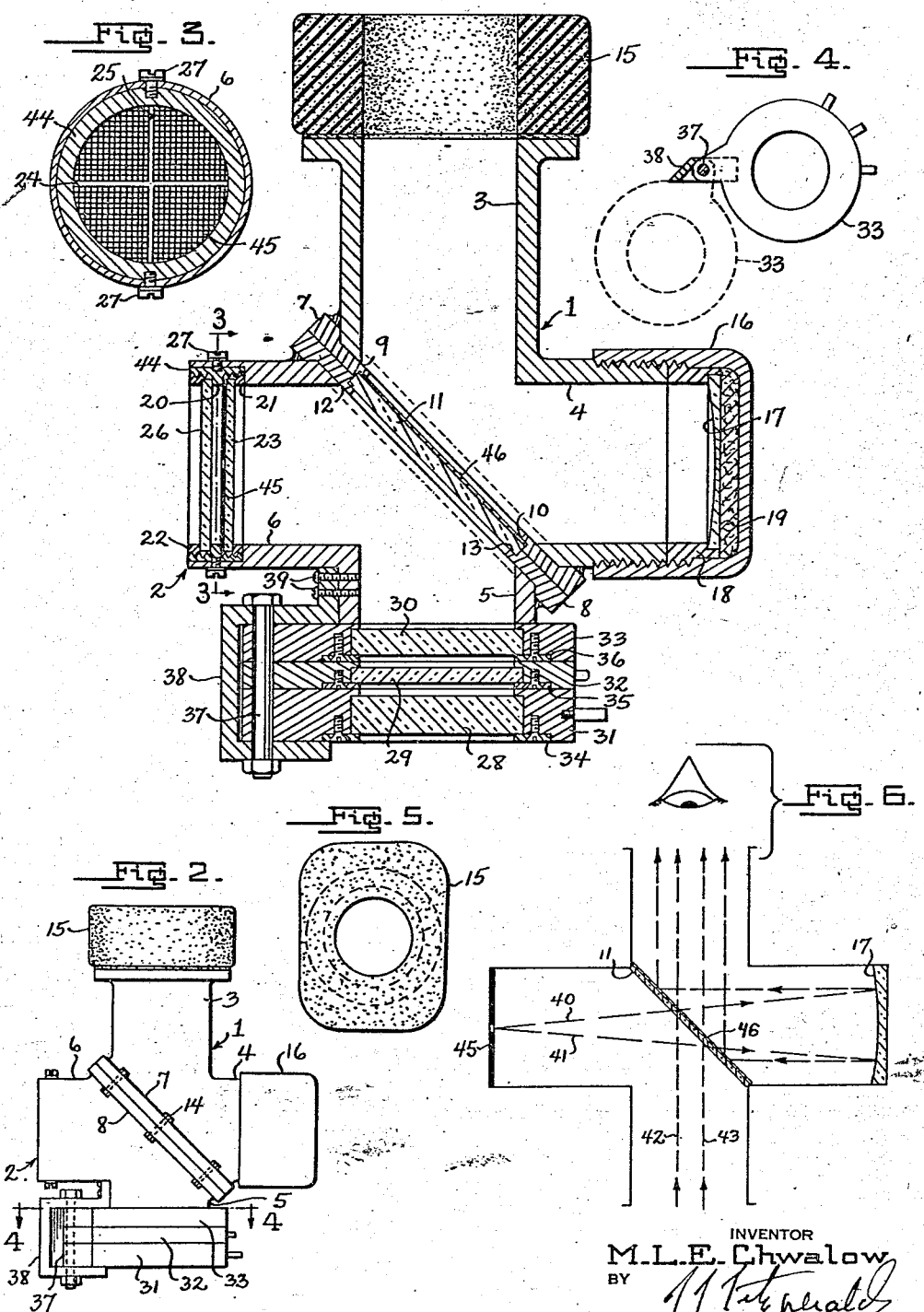
INVENTOR
M. L. E. Chwalow
BY
ATTORNEY

UNITED STATES PATENT OFFICE 2,358,316

SIGHTING DEVICE

Morton L. E. Chwalow, Philadelphia, Pa.

Application July 20, 1942, Serial No. 451,663

2 Claims. (Cl. 88—1)

(Granted under the act of March 3, 1883, as amended April 30, 1928; 370 O. G. 757)

My invention relates to sighting devices and in particular to the type in which an image of a sight pattern is superimposed upon a target in a line of sight established by the user through the device. Sighting devices of this type are not new, several different structures being illustrated in issued patents such as, for example, the Grubb patent, 683,203.

It is believed, however, that the particular optical arrangement employed in my device represents a meritorious advance in the art since it permits a structure which is extremely simple in design, easy to service, and economical to manufacture.

In my arrangement I employ a transparent member having a plane face supported at an angle to the user through which a line of sight to a target may be established by the user. A sight pattern and a concave reflector are disposed on opposite sides of the plane face of the transparent member.

Light passing through the sight pattern and inclined face of the transparent member to the reflector will be reflected back onto the inclined face, and thence into the eye of the user. This optical arrangement produces an image of the sight pattern superimposed upon the target and the image appears to the user to be at the same distance from him as is the target.

A device made in accordance with my invention may be supported upon a pelorus base and used to measure the drift angle of an aircraft by establishing a line of sight through the device to a target located below.

The principles of my invention may also be utilized in the optical system for other sighting devices such as a gun sight, bomb sight, or range estimating device.

In the drawing, which represents a preferred embodiment of my invention, and in which like parts in the various views are designated by like reference characters:

Fig. 1 is a sectional view of the device;

Fig. 2 is a view in elevation;

Fig. 3 is a sectional view on lines 3—3 of Fig. 1, showing the sight pattern;

Fig. 4 is a view on lines 4—4 of Fig. 2, illustrating how filters for the sight may be swung into and out of use;

Fig. 5 is an end view of the eyepiece; and

Fig. 6 is a diagrammatic view illustrating the optical arrangement employed in the device.

Referring now to the drawing, the body of the device consists of a pair of sections 1 and 2 which may be made of any suitable material such as metal or a molded plastic. Section 1 consists of a pair of tubular portions 3 and 4 which intersect at a right angle. Tubular portions 3 and 4 are cut off at an angle of 45° at their intersection which forms an annulus of elliptical contour.

Section 2 likewise consists of a pair of tubular portions 5 and 6 intersecting at a right angle and cut off to form an elliptical annulus at their intersection which is at an angle of 45°.

In order to unite sections 1 and 2, elliptical collars 7 and 8 may be provided respectively for the sections. Collar 7 fixed to section 1 contains an elliptical recess 9 on one side which fits over and is secured to the elliptical annulus of section 1. A second recess 10, also elliptical, on the opposite side, is provided for partially seating a flat transparent member 11 which may be made of crown glass. A face of member 11 may be provided with a very thin semi-transparent layer of reflecting material 46 such as silver to increase the reflectivity of the face. This layer is not, however, essential to the operation of my device.

Collar 8 fixed to section 2 likewise contains an elliptical recess 12 for fitting over the elliptical annulus of section 2 and a second recess 13 for seating the transparent member 11.

Collars 7 and 8, of course, need not be made separately but may be made integral with sections 1 and 2 if the latter are molded or cast.

Collars 7 and 8 (and hence sections 1 and 2) are then fastened together by suitable means such as a plurality of screws 14. When fastened together it will be seen that tubular member 3 is disposed coaxially with tubular member 5. Likewise tubular members 4 and 6 are disposed coaxially and at right angles to the axis of tubular members 3 and 5.

An eyepiece 15 which may be of soft rubber is fitted to the end of tubular portion 3 by cement or any other suitable means.

Tubular portion 4 is threaded externally at the end for receiving an internally threaded cap member 16. Cap 16 houses a concave reflector 17 which is supported in a threaded collar 18, the latter being screwed down in the cap until it and the back of reflector 17 abuts a cushion 19 which may be made of felt or other suitable material. Reflector 17 may be spherical or it may be parabolic. In either case, however, for best results, the sight pattern described below should be at the focus of the reflector.

A holder 44 which is threaded internally and contains an internal shoulder 20 is provided for seating a pair of externally threaded annular collars 21 and 22.

Collar 21 supports a transparent member 23, one face of which is coated with opaque material 45 such as black paint. The sight pattern consists of a pair of slits 24 and 25 cut into the opaque material at right angles to each other. If the device is used for a gun sight, the design of the sight pattern might be a pair of concentric rings in which case a pair of concentric slits would be provided in the coating 45.

Collar 22 supports a diffusing screen 26 which serves to diffuse the light entering the slits 24 and 25.

Holder 44 supporting member 23 and diffusing screen 26 is then seated at the end of tubular member 6 and secured in position by a plurality of screws 27.

In order to vary the intensity of the light coming into the device from the target for purposes of obtaining a good contrast between the illuminated image of the sight pattern and the target, filters such as the three filters 28, 29 and 30 may be utilized.

Filters 28 to 30 are seated respectively in frames 31 to 33 and secured therein by retaining washers 34 to 36.

Frame members 31, 32 and 33 are each provided with an ear portion which is bored so that the frames may be pivotally mounted on a pivot pin 37 which is carried by a bracket 38, the latter being fastened to the exterior surface of tubular section 5 by means of screws 39.

As clearly seen from Fig. 4, the frames containing the filters may be swung into and out of position for filtering as the needs require.

Referring now to Fig. 6, my improved device operates in the following manner:

Some of the light rays passing through slits 24 and 25 will be reflected outwardly through tubular portion 5 by the inclined face of transparent member 11 and will be lost. However, others of such rays (illustrated by rays 40 and 41 in Fig. 6) will pass on through member 11 and semi-transparent layer 46. These rays will strike the concave surface of reflector 17 and, because slits 24 and 25 are situated at the focus of the reflector, the rays will be reflected parallel as shown. These parallel rays striking the inclined face of transparent member 11 and layer 46 will be reflected into the eye of the user to form a luminous image of the slits 24 and 25, which image appears superimposed upon the target which the user sees by direct vision (illustrated by rays 42 and 43) through transparent member 11 and semi-transparent layer 46.

In the event that a more brilliant image of the sight pattern is desired, a small lamp may be placed adjacent the diffusing screen 26 in a manner similar to that illustrated in the aforementioned Grubb patent.

In conclusion, I wish to point out that the particular device described is but a preferred embodiment of my invention and that changes and modifications therein may occur to those skilled in the art without departing from the spirit and scope of my invention, as defined in the appended claims.

The invention described herein may be manufactured and used by or for the Government of the United States for governmental purposes without the payment of any royalties thereon or therefor.

Having thus described my invention, I claim:

1. In a sighting device the combination comprising a pair of body sections, each section comprising a pair of tubular portions intersecting at a right angle and cut on a 45° diagonal at their intersection to form an elliptical opening, means for joining said body sections together with the elliptical openings therein adjacent each other, a transparent member having a plane face disposed at the intersection of said body sections at an angle of 45°, an eyepiece disposed on one tubular portion of one of said body sections, so that the user may establish a line of sight therethrough and through the coaxially disposed tubular portion in the other of said body sections to a target, a sight pattern, and a concave reflector, said sight pattern and reflector being disposed respectively on opposite sides of said transparent member in the other two remaining tubular portions whereby light passing through said sight pattern and plane face of said transparent member to said reflector will be reflected back onto said plane face and thence into the user's eye forming an image of said sight pattern superimposed upon said target.

2. In a sighting device, the combination comprising a pair of body sections, each section comprising a pair of tubular members intersecting at a right angle and cut on a 45° diagonal at their intersection to form an opening, means for joining said body sections together with the openings therein adjacent each other to form two pairs of axially aligned tubular members, a plane transparent member disposed at the intersection of said body sections, one pair of axially aligned tubular members serving to permit the user of the device to establish a line of sight therethrough to a target, a sight pattern, and collimating means, said sight pattern and collimating means being disposed on opposite sides of said transparent member in the other pair of axially aligned tubular members, whereby light passing through said sight pattern and transparent member to said collimating means will be reflected back onto said transparent member and thence into the user's eyes forming an image of said sight pattern superimposed upon said target.

MORTON L. E. CHWALOW.